March 30, 1954     C. L. PUERTA     2,673,621
SAFETY LUBRICATING DEVICE

Filed May 2, 1952     3 Sheets-Sheet 2

CLEMENTE L. PUERTA
INVENTOR

HUEBNER, BEEHLER,
WORREL & HERZIG
ATTORNEYS

March 30, 1954 C. L. PUERTA 2,673,621
SAFETY LUBRICATING DEVICE
Filed May 2, 1952 3 Sheets-Sheet 3
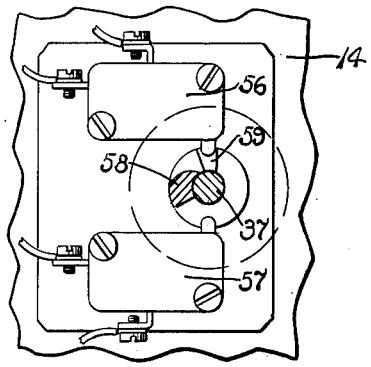
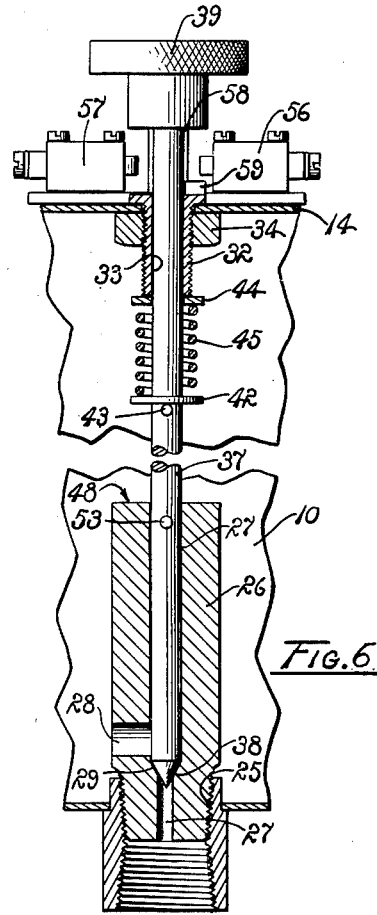
CLEMENTE L. PUERTA
INVENTOR
HUEBNER, BEEHLER,
WORREL & HERZIG
ATTORNEYS Patented Mar. 30, 1954

2,673,621

UNITED STATES PATENT OFFICE 2,673,621

SAFETY LUBRICATING DEVICE

Clemente L. Puerta, Fresno, Calif., assignor of one-half to Lloyd T. Fiese and one-half to L. W. Firstenberger, both of Fresno, Calif.

Application May 2, 1952, Serial No. 285,813

9 Claims. (Cl. 184—6)

The present invention relates to electrically controlled apparatus requiring lubrication and more particularly to a safety lubricating device for such apparatus.

Many electrically controlled and/or electrically operated apparatus such as pumps, conveyors, blowers, mixers, shredders, hammer mills, and the like, are lubricated by the gravity flow of lubricant to bearings and the like. It is the usual practice to provide reservoirs for liquid lubricant which are connected to members requiring lubrication by conduits and which provide manually controlled valves whereby gravitational flow of lubricant can be manually interrupted when such devices are inoperative to avoid waste of lubricant. These lubricating systems are obviously subject to human error.

For example, it is the usual practice in the irrigable farm lands of the western portion of the United States to pump water by means of electrically driven pumps which are lubricated by the gravity flow of lubricant from reservoirs regulated by manual control means. It has been found that by far the greatest proportion of pump failures result from inadequate lubrication. Attendants frequently fail to open the reservoirs for lubricating purposes when operation of such pumps is initiated, fail to close the reservoirs to retain lubricant when pump operation is interrupted with the result that the lubricant is wasted and the reservoirs therefore drained, and fail to observe lubricant levels in the reservoirs with sufficient frequency to assure adequate supply. After a pump or other device has been damaged by operation with inadequate lubrication, it is easy for an attendant to refill the reservoirs so as to create the impression of proper care so that the true cause of the damage is difficult to establish, even though the failure of the lubrication is evident upon pump examination.

An object of the present invention is to obviate or minimize the damages to electrically controlled and/or motivated apparatus incident to inadequate lubrication.

Another object of the present invention is to provide a safety lubricating device for electrically controlled and/or electrically motivated apparatus precluding operation of such apparatus in the absence of adequate fluid lubricant therefor.

Another object is to provide a safety lubricating device for electrically controlled and/or operated apparatus precluding operations of the apparatus without conditioning the lubricating system thereof for the flow of lubricant thereto.

Another object is to provide a safety lubricating device for electrically controlled and/or motivated apparatus adapted to activate said apparatus in response to the supplying of lubricant therefor and to deactivate the apparatus in response to interruption of lubricant supply therefor.

Further objects are to provide improved elements and arrangements thereof in a device of the character and for the purposes set forth that is economical to produce, easy to install, fully effective in assuring adequate lubrication during operation of associated apparatus, and dependable.

In the drawings:

Fig. 5 is a fragmentary enlarged section taken on line 5—5 of Fig. 3.

Fig. 6 is an enlarged section taken on line 6—6 of Fig. 2.

Fig. 7 is a perspective view of a needle valve and cam employed in the device of the present invention, a portion thereof being removed for illustrative convenience.

Fig. 8 is a somewhat enlarged perspective of the cam shown in Fig. 7.

Fig. 9 is a fragmentary enlarged plan view of a portion of the structure shown in Fig. 2 illustrating a float switch mounting and control structure.

Fig. 10 is a section taken on line 10—10 of Fig. 9.

Fig. 11 is a section taken on line 11—11 of Fig. 9.

Figure 1:
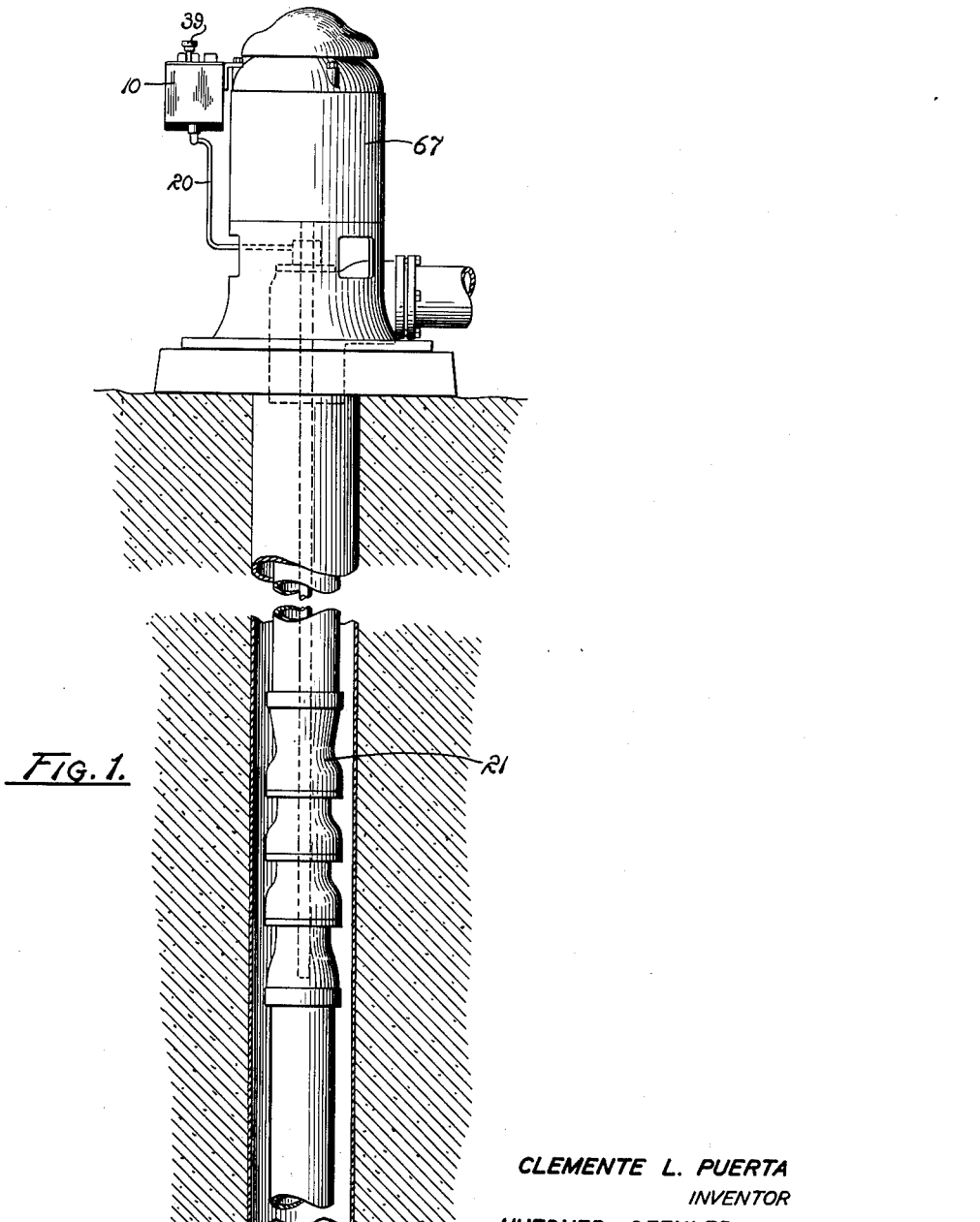
Fig. 1 is a longitudinal section of a well having a pump mounted therein which requires lubrication having driven connection to an electric motor and shown equipped with a safety lubricating device embodying the principles of the present invention.

Referring in greater detail to the drawings:

A reservoir of any desired size and shape is indicated at 10 having a pool of lubricant 11 contained therein. The reservoir provides a drain plug 12 for cleaning convenience and has an open top 13. A cover 14 is releasably mounted in closing relation to the top 13 as by screws 15. The cover provides a breathing opening 16. A transparent tubular gauge 17 is provided at a side of the reservoir for visual reference to the level of lubricant contained therein.

A conduit 20 is connected to the reservoir and is downwardly extended therefrom for connection to a pump 21 or other electrically controlled and/or motivated apparatus, not shown. If desired, a plug 22 may be provided in the conduit 20 having an orifice 23 therethrough.

The conduit has a screwthreaded open end 25 disposed within the reservoir below the normal level of the pool of lubricant 11. A valve body 26 is screwthreadably mounted in the open end 25 of the conduit and provides a bore 27 substantially vertically therethrough. An inlet bore 28 extends from the bore 27 to the side of the body 26 and a valve seat formed at the juncture of the bores 27 and 28 about the lower end of the bore 27 which is preferably of reduced diameter.

A flanged bearing 32 having a bore 33 therethrough is mounted in vertical alignment with the bore 27 as by means of a mounting nut 34 screwthreadably tightened on the bearing with the cover 14 sandwiched between the nut and the flange of the bearing.

A needle valve 37 is rotatably mounted in the bore 33 of the bearing 32 and the bore 27 of the valve body 26 for reciprocal elevational movement and has a lower end 38 fitted to the seat 29. A knurled head is mounted on the needle valve above the cover 14 for operator convenience.

A thrust washer 42 is mounted on the needle valve in downwardly spaced relation to the lower end of the bearing 32 as by a pin 43 extended through the needle valve. A washer 44 is positioned on the needle valve 37 against the lower end of the bearing 32 and a spring 45 located between the washers 42 and 44 under initial compression. It will be apparent that the spring 45 urges the needle valve downwardly into seat engagement with the valve seat 29 while accommodating rotational movement of the needle valve.

Figure 2:
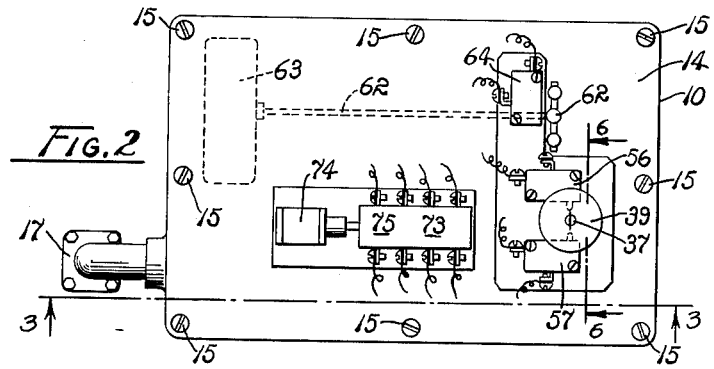
Fig. 2 is a somewhat enlarged plan view of a safety lubricating device embodying the principles of the present invention with electrical wiring thereof shown only fragmentarily for illustrative convenience.
Figure 3:
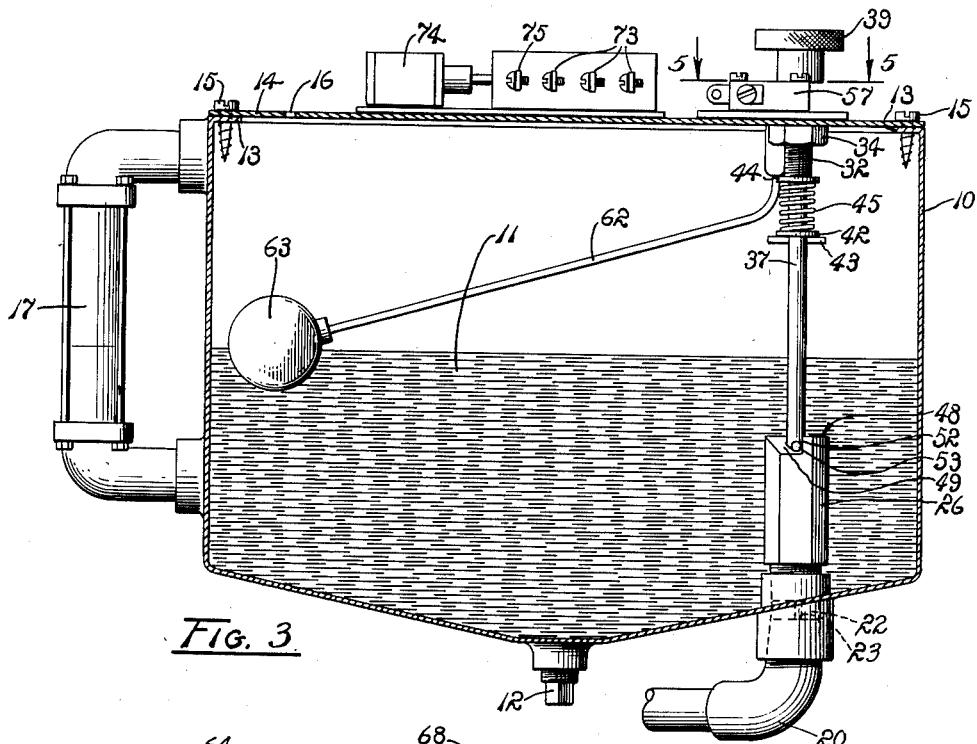
Fig. 3 is a vertical section taken on line 3—3 of Fig. 1.

The upper end of the valve body 26 is shaped to provide an annular cam surface 48 in circumscribing relation to the needle valve 37 and upwardly disposed. The cam surface provides an inclined portion 49, an upper dwell 50 traversed by a groove 51 radially of the bore 27 and a precipitous face 52 in consecutive relation in clockwise progression as viewed in Figs. 7 and 8. A cam follower 53 is radially extended from the needle valve in engagement with the cam surface 48 so that as the needle valve is rotated in a clockwise direction as viewed in Figs. 2 and 7, the follower traverses the inclined portion 49 to elevate the needle valve against the urging of the spring 45 to open the lower end of the bore 27. When the follower reaches the groove 51 it is releasably engaged therein holding the needle valve in predetermined open position. Upon continued clockwise rotation of the needle valve, the cam follower 53 traverses the remaining portion of the dwell 50 with the needle valve in open position and descends the precipitous face 52 under the urging of the spring 45 to a predetermined stop position with the needle valve rested in the valve seat 29.

A start switch 56 of any suitable form resiliently urged into open position is mounted on the cover 14 adjacent to the needle valve 37. A stop switch 57 resiliently urged into closed position is mounted on the cover adjacent to the needle valve. A switching cam 58 is provided on the needle valve in a position engageable with the start switch to close the same when the valve is in starting position and engageable with the stop switch to close said switch when the valve is in stop position. It will be apparent, that in rotational travel of the needle valve from stop position to start position, the switching cam 58 has a predetermined rotational and upwardly directed path of travel so long as the cam follower 53 travels in engagement with the cam surface 48. To preclude failure of the safety device of the present invention by removal, breakage, or other failure of the cam follower 53, a rigid stop 59 is upwardly extended from the bearing 32 below the path of travel of the switching cam intermediate its stop and start positions at a level above the lower end of the cam when in stop position. Thus, if due to failure of the cam follower 53, the needle valve 37 fails to raise during rotation from stop to start position to open the bores 27 and 28 for flow of lubricant through the conduit 20 to an associated apparatus requiring lubrication, the switching cam 58 will strike the stop 59 and preclude sufficient rotation of the needle valve to close the start switch 56.

A float arm 62 is pivotally mounted in the cover 14 in any suitable manner and downwardly extended into the reservoir 10 and mounts a float 63 on the extended end thereof. The float is buoyant in lubricant and rises and falls in response to variation in the level of the pool of lubricant. A float switch 64 is mounted on the cover adjacent to the float arm 62 and is closed by movement of the float 63 above a predetermined level and opened by movement of the float below said predetermined level. It has been found convenient to utilize a switch resiliently urged into closed position having a control member engageable by the arm 62 when the float descends below the predetermined lubricant level to open the switch.

Figure 4:
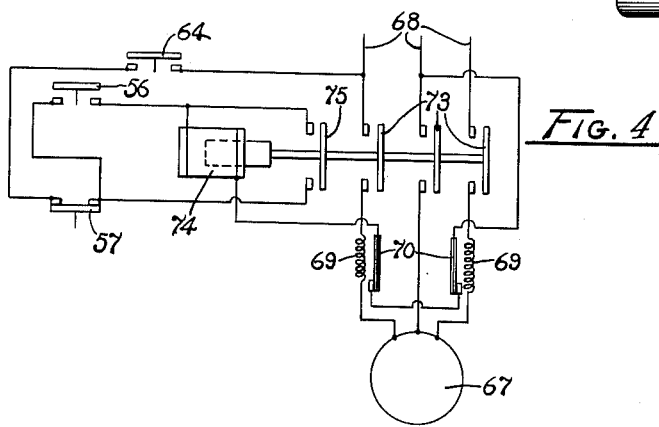
Fig. 4 is a schematic wiring diagram of the electrical system of the present invention.

In Fig. 4 an electric motor is represented at 67 intended to characterize electric motivating means for the pump 21 and the like requiring lubrication. The illustrated motor is three phase and connected to three conductors 68 having connection to any suitable source of energy. As is the usual practice, thermal units 69 are provided in the conductor 68 having associated bimetal strip switches 70 which are normally closed but open in response to excessive heating of the thermal units as by excessive load on the motor 67. A master control switch 73 is positioned in the conductor 68 in the well known manner. A solenoid 74 or other electromagnetic means has connection to the master control switch so that when the solenoid is energized, said switch is closed and when deenergized the switch is opened. A sustaining switch 75 is also connected to the solenoid and opened and closed concurrently with the master control switch 73.

The conductors 68, thermal unit 69, and master control switch 73 constitute a motivating circuit for the motor 67. A control system is connected between a pair of conductors 68 electrically in advance of the master control switch 73. The control system connects the float switch 64, the stop switch 57, and the start switch 56 in series with the solenoid 74, and the bi-metal strip switches 70. The control system also connects the sustaining switch 75, in series with the float switch 64, stop switch 57, solenoid 74, and thermal unit 69, in bypass or parallel relation to the start switch 56.

Operation

The operation of the safety lubricating device of the present invention is believed to be clearly apparent and is briefly summarized at this point. To actuate the motor 67 or any other apparatus of the character described with which the safety device is associated, the needle valve 37 is rotated in a clockwise direction as viewed in Figs. 2, 5, and 7. Initial rotation elevates the needle valve from the seat 29 and opens the conduit 20 for the flow of lubricant therethrough to the pump 21. The rotation of the needle valve is continued until the cam follower 53 seats in the groove 51 in which position the switching cam 58 closes the start switch 56. If the supply of lubricant 11 in the reservoir 10 is above the predetermined adequate level, the float switch 64 will also be closed. When both the float switch and start switch are closed, electrical energy is supplied to the solenoid 74 therethrough and through the stop switch 57 which serves to close the sustaining switch 75 and the master control switch 73 actuating the motor 67. If at the moment the start switch 56 is closed or if during actuation of the motor 67 the supply of lubricant is depleted, the float switch 64 will be opened interrupting the energizing of the solenoid and causing the master control switch and sustaining switch to open.

If the needle valve 37 is further rotated in the clockwise direction described, the switching cam 58 will leave the start switch 56 permitting the start switch to open. This does not interrupt operation of the motor 67 because the solenoid is energized through the sustaining switch 75 in parallel relation to the start switch.

To interrupt operation of the motor 67, the needle valve 37 is rotated to its stop position. As the cam follower 53 descends the precipitous face 52 the needle valve 37 descends into the seat 29 precluding lubricant flow through the conduit 20. Concurrently, the switching cam 58 opens the stop switch 57 deenergizing the solenoid 74 and opening the sustaining switch 75 and master control switch 73.

The thermal unit 69 and bi-metal switches 70 operate in the same manner to deenergize the solenoid 74 and to open the sustaining switch 75 and master control switch 73 in the event excessive load on the motor 67 causes excessive heating of the thermal units.

When decrease in lubricant level in the reservoir 10 causes the float switch 64 to open, the motor 67 cannot be restarted until additional lubricant has been supplied to the reservoir adequate to close the float switch 64.

The safety lubricating device of the present invention obviates the damage incident to operation with inadequate lubrication of electrically controlled and/or electrically motivated apparatus. For example, an internal combustion engine may be protected by the device of the present invention by simply substituting the start switch 56 for the ignition switch of such an engine. The device is simple in structure, economical to provide, and has proved entirely dependable in use.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A safety lubricating device for electrically controlled apparatus having an electrical system including electro-magnetic holding means which actuate the apparatus when energized and which interrupt the apparatus when de-energized comprising a reservoir for fluid lubricant, a conduit interconnecting the reservoir and the apparatus, a valve having predetermined open and closed positions mounted in the conduit, a sustaining switch closed by energizing the holding means and opened by de-energizing the holding means, a start switch connected electrically in series with the holding means and in parallel to the sustaining switch closed by movement of the valve to open position, a stop switch connected electrically in series with the start switch and in series with the sustaining switch opening by movement of the valve to closed position, and a switch responsive to lubricant level in the reservoir connected electrically in series with the stop switch and the parallel start switch and sustaining switch.

2. In combination with an apparatus requiring lubrication and having an electrical control system including electromagnetic holding means which actuate the apparatus when energized and which interrupts functioning of the apparatus when de-energized having a sustaining switch closed when the holding means is energized and opened when the holding means is de-energized; a reservoir for fluid lubricant in fluid communication with the apparatus, a control valve regulating the flow of lubricant from the reservoir to the apparatus having a predetermined closed position and a predetermined open position, a start switch resiliently urged into open position, a stop switch resiliently urged into closed position, and means borne by the valve engageable with the start switch to close said switch upon movement of the valve to open position and engageable with the stop switch to open said switch upon movement of the valve to closed position, the start switch and the stop switch being electrically connected in series with the electromagnetic holding means in the control system and the stop switch being also connected in series with the sustaining switch and the electromagnetic holding means in bypass relation to the start switch.

3. In combination with an apparatus requiring lubrication having an electrical control system including electromagnetic holding means which actuate the apparatus when energized and which interrupts functioning of the apparatus when de-energized, a sustaining switch closed by energizing the holding means and opened by de-energizing the holding means, a reservoir for fluid lubricant connected to the apparatus, a valve mounted in the conduit having a predetermined closed position and a predetermined open position, a start switch mounted adjacent to the valve, a stop switch mounted adjacent to the valve, and means borne by the valve engageable with the start switch to close the same upon movement of the valve to open position and engageable with the stop switch to open the same upon movement of the valve to closed position, the start switch and the stop switch being electrically connected in the control system in series with the electromagnetic holding means and the stop switch and the sustaining switch being electrically connected in series with the holding means in parallel relation to the start switch.

4. A safety lubricating device for electrically motivated apparatus comprising a reservoir, a pool of fluid lubricant in the reservoir, a conduit interconnecting the reservoir and the electrically motivated apparatus, a valve mounted in the conduit including a rotatable valve stem having predetermined opened and closed positions, a start switch resiliently urged into open position mounted adjacent to the valve stem, a stop switch resiliently urged into closed position mounted adjacent to the valve stem, a cam mounted on the stem engageable with the start switch to close the same upon rotation of the stem to opened position and engageable with the stop switch to open the same upon rotation of the stem to closed position, a float rested on the lubricant in the reservoir, a float switch connected to the float held closed by elevational movement of the float above a predetermined level and opened by descent of the float below said predetermined level, a motivating circuit connected to the apparatus, a master switch in series with the apparatus in the motivating circuit, electromagnetic means connected to the master switch adapted to close the master switch when energized and to open said switch when de-energized, a sustaining switch connected to the electromagnetic means also closed by the electromagnetic means when energized and opened thereby when de-energized, and a control circuit connecting the float switch, the stop switch, the start switch and the electromagnetic means in series and connecting the float switch, the stop switch, the sustaining switch and the electromagnetic means in parallel to the start switch.

5. A safety lubricating device for electrically motivated apparatus comprising a reservoir for fluid lubricant, a conduit interconnecting the reservoir and the electrically motivated apparatus, a valve seat mounted in the conduit upwardly disposed within the reservoir, a needle valve rotatably mounted in the reservoir for longitudinal movement to and from engagement with the valve seat, resilient means urging the needle valve into valve seat engagement, a handle connected to the needle valve, a cam mounted in circumscribing relation to the needle valve having an annular surface advanced and receded endwardly of the needle valve, a cam follower outwardly extended from the needle valve into cam surface engagement whereby rotation of the needle valve to a predetermined position lifts the valve from valve seat engagement and further rotation to a second predetermined position releases the valve to engage the seat under the urging of the resilient means, a switching cam radially extended from the needle valve for unitary rotational movement therewith having a predetermined starting position when the valve is rotated to lifted position and a predetermined stopping position when the valve is in seat engagement, a start switch resiliently urged into open position mounted for engagement by the switching cam in starting position to close the same, a stop switch resiliently urged into closed position mounted for engagement by the switching cam in stopping position to open the same, a float mounted within the reservoir for elevational movement in response to lubricant level variation in the reservoir, a float switch connected to the float closed by elevational movement of the float above a predetermined level and opened by descent of the float below said level, a master switch interconnecting the electrically motivated apparatus and a source of electrical energy, electromagnetic means having controlling connection to the master switch adapted to close said switch when energized and to open the switch when de-energized, a sustaining switch connected to the electromagnetic means and opened and closed concurrently with the master switch, and an electrical control system connecting the float switch, stop switch and start switch in series with the electromagnetic means and connecting the float switch, stop switch and sustaining switch in series with the electromagnetic means in bypass relation to the start switch.

6. A safety lubricating device for apparatus requiring lubrication and having an electric control system comprising a reservoir for fluid lubricant, a conduit interconnecting the reservoir and the electrically controlled apparatus, a valve seat mounted in the conduit within the reservoir, a needle valve rotatably mounted in the reservoir for longitudinal movement to and from engagement with the valve seat, resilient means urging the needle valve into valve seat engagement, a cam mounted in circumscribing relation to the needle valve having an annular surface advanced and receded endwardly of the needle valve, a cam follower outwardly extended from the needle valve into cam surface engagement whereby rotation of the needle valve to a predetermined position lifts the valve from valve seat engagement and further rotation to a second predetermined position releases the valve to engage the seat under the urging of the resilient means, a switching cam outwardly extended from the needle valve for unitary rotational movement therewith having a predetermined starting position when the valve is rotated to lifted position and a predetermined stopping position when the valve is in seat engagement, control switch means resiliently urged into open position electrically connected in the control system of the apparatus requiring lubrication mounted for engagement by the switching cam in starting position to close the switch, a float mounted within the reservoir for elevational movement in response to lubricant level variation in the reservoir, and a float switch connected to the float closed by elevational movement of the float above a predetermined level and opened by descent of the float below said level, said float switch being connected electrically in series with the control switch means in the control system for the apparatus.

7. The safety device of claim 5 in which a stop is mounted in fixed position below the path of travel of the switching cam from stop to start position and upwardly extended a predetermined distance less than the extent of lifting of the needle valve in rotation from valve seat engagement to lifted position and terminated at a height above the lowest portion of the switching cam when in stop position whereby the stop is ineffective when the needle valve is lifted during rotation by cam follower and cam engagement and precludes rotation from stop to start position when the needle valve fails to lift.

8. A safety lubricating device for electrically controlled apparatus having an electrical system including electro-magnetic holding means which actuate the apparatus when energized and which interrupts functioning of the apparatus when de-energized comprising a reservoir for fluid lubricant, a conduit interconnecting the reservoir and the apparatus, a valve having predetermined open and closed positions mounted in the conduit, a sustaining switch closed by energizing the holding means and opened by de-energizing the holding means, a start switch connected electrically in series with the holding means and in parallel to the sustaining switch closed by movement of the valve to open position, and a stop switch connected electrically in series with the start switch and in series with the sustaining switch opened by movement of the valve to closed position.

9. A safety lubricating device for electrically controlled apparatus requiring lubrication comprising a reservoir for fluid lubricant, a conduit interconnecting the reservoir and the apparatus, a valve having predetermined open and closed positions mounted in the conduit, a start switch closed by movement of the valve to open position, a stop switch opened by movement of the valve to closed position, a float switch closed when lubricant in the reservoir reaches a predetermined level and opened when the lubricant decreases below said level, and an electrical circuit connected to the apparatus controlled by the start switch, stop switch and float switch including said start switch, stop switch and float switch connected electrically in series.

CLEMENTE L. PUERTA.

References Cited in the file of this patent

UNITED STATES PATENTS

| Number | Name | Date |
| --- | --- | --- |
| 1,140,557 | Anderson | May 25, 1915 |
| 1,184,029 | Schatz | May 23, 1916 |

FOREIGN PATENTS

| Number | Country | Date |
| --- | --- | --- |
| 644,874 | Great Britain | Oct. 18, 1950 |